(12) United States Patent
Hsiao et al.

(10) Patent No.: US 7,874,627 B2
(45) Date of Patent: Jan. 25, 2011

(54) ASSEMBLY FOR CONNECTING PLATES

(75) Inventors: Hsin-Hung Hsiao, Taipei (TW);
Lin-Hsu Chiang, Taipei (TW)

(73) Assignee: Asustek Computer Inc., Peitou, Taipei (TW)

( * ) Notice: Subject to any disclaimer, the term of this patent is extended or adjusted under 35 U.S.C. 154(b) by 316 days.

(21) Appl. No.: 12/050,348

(22) Filed: Mar. 18, 2008

(65) Prior Publication Data
US 2008/0247129 A1  Oct. 9, 2008

(30) Foreign Application Priority Data
Apr. 3, 2007  (TW) .............................. 96111864 A

(51) Int. Cl.
*A47B 81/00* (2006.01)

(52) U.S. Cl. ............... 312/223.2; 312/265.5; 312/319.1

(58) Field of Classification Search ............. 312/223.2, 312/263, 265.5, 319.1; 361/679.58, 679.6, 361/752

See application file for complete search history.

(56) References Cited

U.S. PATENT DOCUMENTS

| | | | |
|---|---|---|---|
| 5,713,647 A | 2/1998 | Kim | |
| 6,109,710 A * | 8/2000 | Wu et al. | 312/223.2 |
| 6,816,391 B2 * | 11/2004 | Davis et al. | 361/818 |
| 6,899,407 B1 * | 5/2005 | Lai | 312/223.2 |
| 6,906,927 B2 * | 6/2005 | Su | 361/727 |
| 6,932,447 B2 * | 8/2005 | Chen et al. | 312/223.2 |
| 7,082,036 B2 * | 7/2006 | Cheng et al. | 361/726 |
| 7,180,013 B2 * | 2/2007 | Peng et al. | 361/759 |
| 7,404,610 B2 * | 7/2008 | Smith et al. | 312/223.2 |
| 2005/0040740 A1 * | 2/2005 | Yun | 312/223.2 |
| 2006/0028103 A1 * | 2/2006 | Smith et al. | 312/223.2 |

* cited by examiner

*Primary Examiner*—Hanh V Tran
(74) *Attorney, Agent, or Firm*—Thomas, Kayden, Horstemeyer & Risley, LLP

(57) ABSTRACT

An assembly for connecting plates is provided. A first plate has a first opening and a second opening; a metal wire is movably connected to one surface of the first plate, and the metal wire includes a bending portion corresponding to the position of the first opening; a spring connects the first plate and the metal wire; a pressing element is fixed on the metal wire and passes through the second opening of the first plate to protrude from the other surface of the first plate. The second plate has a hook. When the first plate and the second plate are assembled, the hook of the second plate passes through the first opening of the first plate, and the bending portion of the first plate prevents the hook from separating from the first opening by tension force of the spring thus to connect the first plate and the second plate.

9 Claims, 6 Drawing Sheets

ASSEMBLY FOR CONNECTING PLATES

RELATED APPLICATIONS

This application claims priority to Taiwan Application Serial Number 96111864, filed Apr. 3, 2007, which is herein incorporated by reference.

BACKGROUND OF THE INVENTION

1. Field of the Invention

The invention relates to an assembly for connecting plates and, more particularly, to a toolless assembly for connecting plates of a computer housing.

2. Description of the Related Art

When components are installed into a computer, a side plate or a back plate of the computer housing has to be opened. To secure the side plate or the back plate to the housing, tools such as screws are usually used. When electronic components are to be installed into a computer, a tool (such as a screwdriver) always be used to remove the screws thus to remove the side plate or the back plate for installation. After the components have been installed, the user has to secure the side plate or the back plate to the housing by the tool again.

It is inconvenient when a user removes or secures the side plate or the back plate by tools to install the components. Further, if user does not have the tool for removing the screws, the side plate or the back plate can not be removed from the housing.

BRIEF SUMMARY OF THE INVENTION

The invention provides an assembly for assembling or disassembling of the plates.

The assembly for connecting plates is provided. Elements of the assembly for connecting plates are described as follows. The assembly for connecting plates according to a preferred embodiment of the invention cooperates with a second plate with a hook. The assembly for connecting plates at least includes a first plate having a first opening and a second opening, a metal wire movably connected to one surface of the first plate and including a bending portion corresponding to the position of the first opening, a spring connecting the first plate and the metal wire and a pressing element fixed on the metal wire and passing through the second opening of the first plate to protrude from the other surface of the first plate.

When the first plate and the second plate are assembled, the hook of the second plate passes through the first opening of the first plate, and the bending portion of the first plate prevents the hook unlock the first opening by the tension force of the spring, thus to connect the first plate and the second plate. When the pressing element is driven, the tension force of the spring is againsted to drive the metal wire to slide, so that the bending portion separates from the hook, the first plate and the second plate are thus disassembled.

In a preferred embodiment, the hook of the second plate has an inclined surface. When the hook of the second plate passes through the first opening of the first plate, the inclined surface is used to push the bending portion. Further, the hook of the second plate also has a recess. When the first plate and the second plate are assembled, the bending portion of the first plate is inserted into the recess of the hook by the tension force of the spring to prevent the hook unlock the first opening.

When the first plate and the second plate are assembled, the direction of the hook passing through the first opening is perpendicular to that of the metal wire sliding on the first plate.

Both the first opening and the second opening may be I-shaped. The metal wire may be an iron wire and be disposed on the edge of the first plate. The first plate and the second plate may be housing plates of a computer host.

These and other features, aspects, and advantages of the present invention will become better understood with regard to the following description, appended claims, and accompanying drawings.

DETAILED DESCRIPTION OF THE EMBODIMENTS

The invention provides an assembly for connecting plates to assemble or disassemble the plates without screws by a metal wire and a spring. Details of the invention are described with the embodiment hereinbelow.

Figure 1:
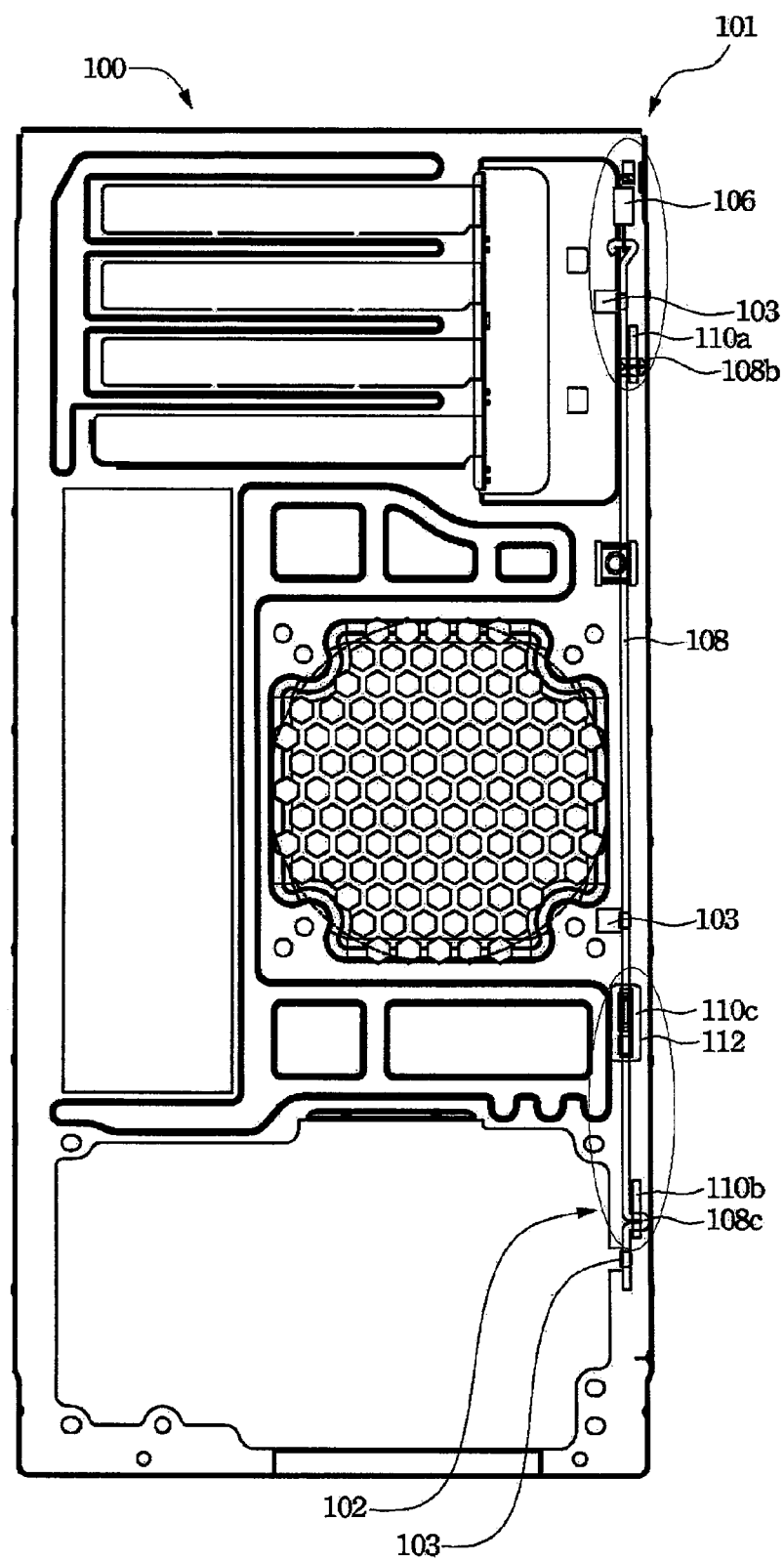
FIG. 1 shows a plate with connecting assembly according to a preferred embodiment of the invention.
Figure 2:
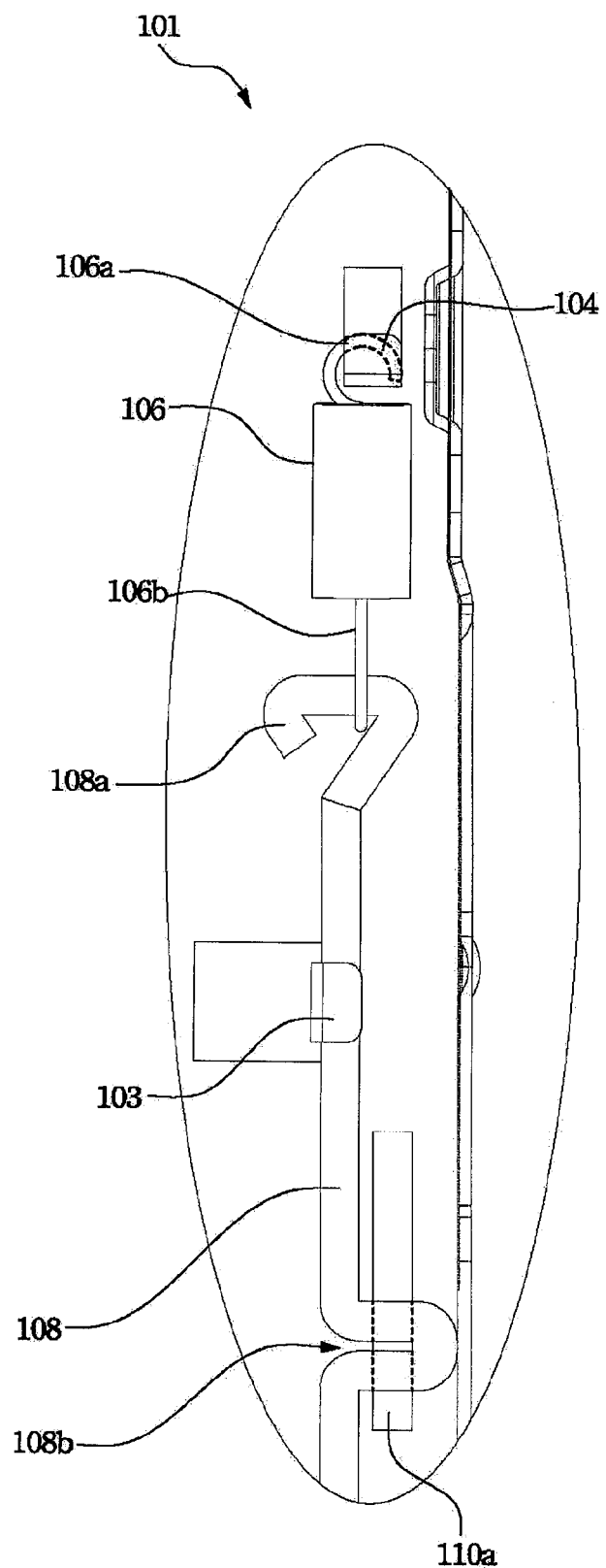
FIG. 2 shows the partial enlargement of the first portion of the connecting assembly in FIG. 1.
Figure 3:
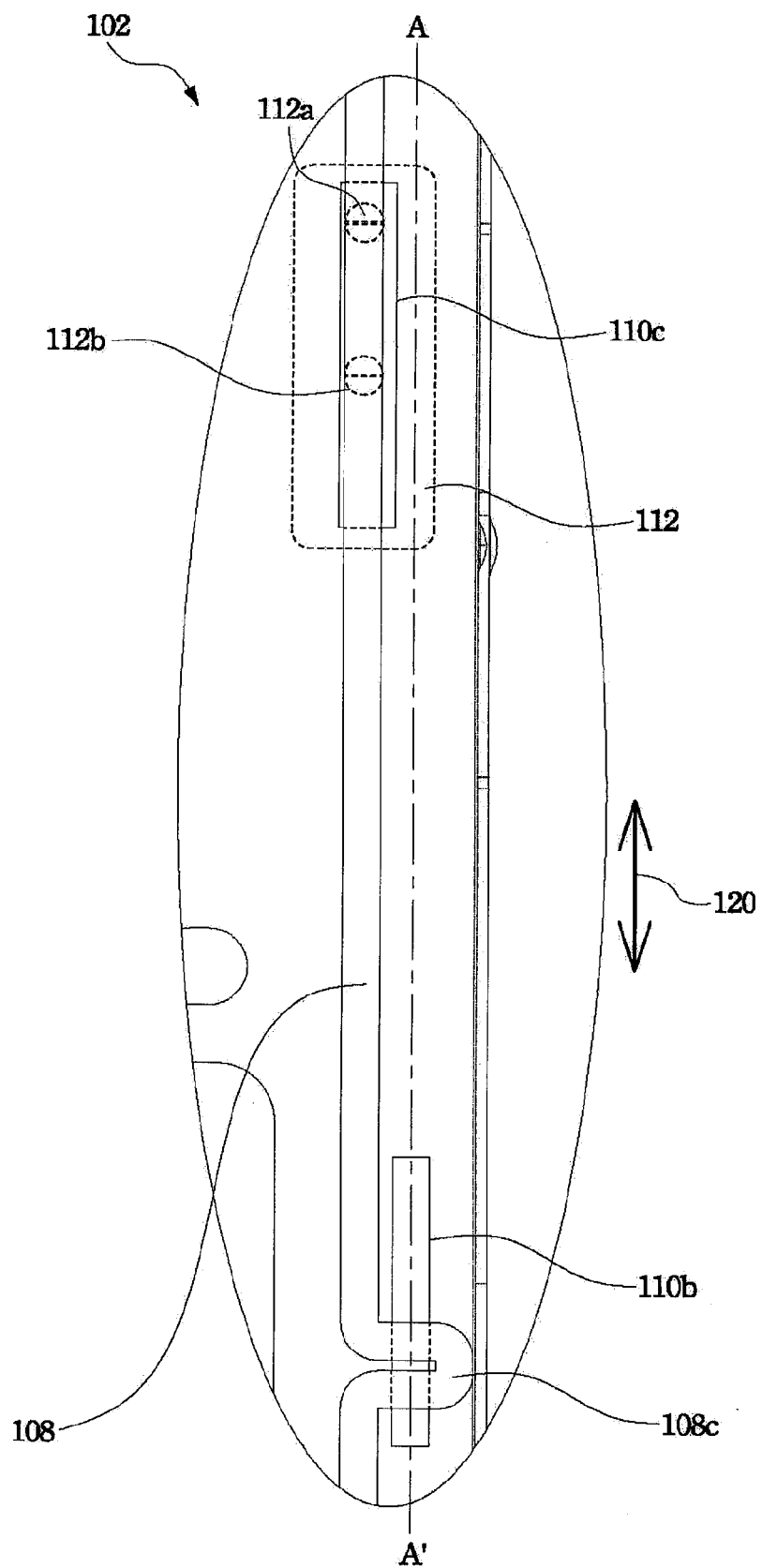
FIG. 3 shows the partial enlargement of the pressing element and the metal wire of the connecting assembly in FIG. 1.

FIG. 1 is a schematic diagram showing a plate and a connecting assembly. FIG. 2 is partial enlargement of a first portion 101 of the connecting assembly in FIG. 1. FIG. 3 is partial enlargement of a second portion 102 of the connecting assembly in FIG. 1.

Please refer to FIG. 1. A plate 100, which is a back plate of a computer housing, and connecting elements includes a metal wire 108 and a spring 106 are disposed on the edge of plate 100. The metal wire 108 is movably connected to one surface of the plate 100. In detail, the metal wire 108 is disposed through a plurality of sleeve members 103 on the edge of the plate 100, and the metal wire 108 is able to slide inside the sleeve members 103 relatively to the plate 100. The metal wire 108 has U-shaped bending portions 108b, 108c.

Please refer to FIG. 2 the partial enlargement of a first portion 101 of the connecting assembly in FIG. 1. The spring 106 of the connecting assembly provides tension force for the metal wire 108. An end portion 106a of the spring 106 is connected with a fastening portion 104 of the plate 100. The other end portion 106b of the spring 106 is connected to an end portion 108a of the metal wire 108. With the configuration, the spring 106 pulls the metal wire 108 thus to connect two plates with its own elastic force while the spring 106 deformed.

Please refer to FIG. 2 and FIG. 3 together. The connecting assembly may further include openings 110a, 110b, 110c on the plate 100. All the openings are I-shaped. The bending portion 108b of the metal wire 108 inserts the opening 110a in the position as shown in FIG. 2, and the bending portion 108c of the metal wire 108 would insert the opening 110b in the position as shown in FIG. 3. Further, the sliding direction 120 of the metal wire 108 is parallel with the long axis direction of the openings 110a, 110b.

In FIG. 3, the second portion 102 of the connecting assembly further includes a pressing element 112 for controlling the position of the metal wire 108. The pressing element 112 and the metal wire 108 are respectively disposed at the inner and outer surfaces of the plate 100 (the perspective lines are shown as dotted lines). The connecting ends 112a, 112b of the pressing element 112 pass through the opening 110c to connect the metal wire 108. The opening 110c limits the sliding distance of the metal wire 108. When a user drives the pressing element 112 to against the tension force of the spring, the opening 110c blocks the connecting ends 112a, 112b of the pressing element 112 thus to limit the sliding distance of the metal wire 108.

FIG. 1, FIG. 2 and FIG. 3 show the plate 100 and the connecting assembly in the present embodiment. Assembled and disassembled the plate 100 and another plate with the connecting assembly is described hereinbelow.

Figure 4:
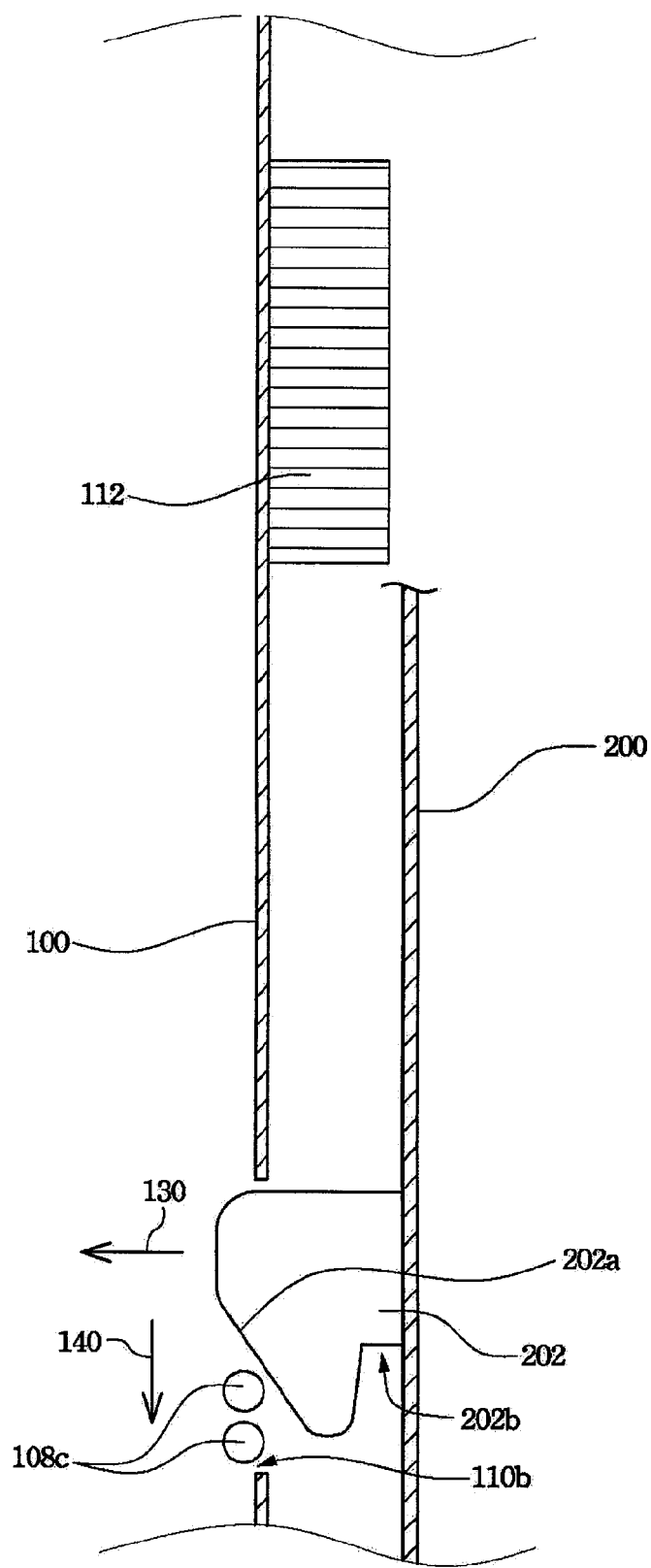
FIG. 4 and FIG. 5 show lateral views of the connecting assembly while connecting two plates in a preferred embodiment.
Figure 5:
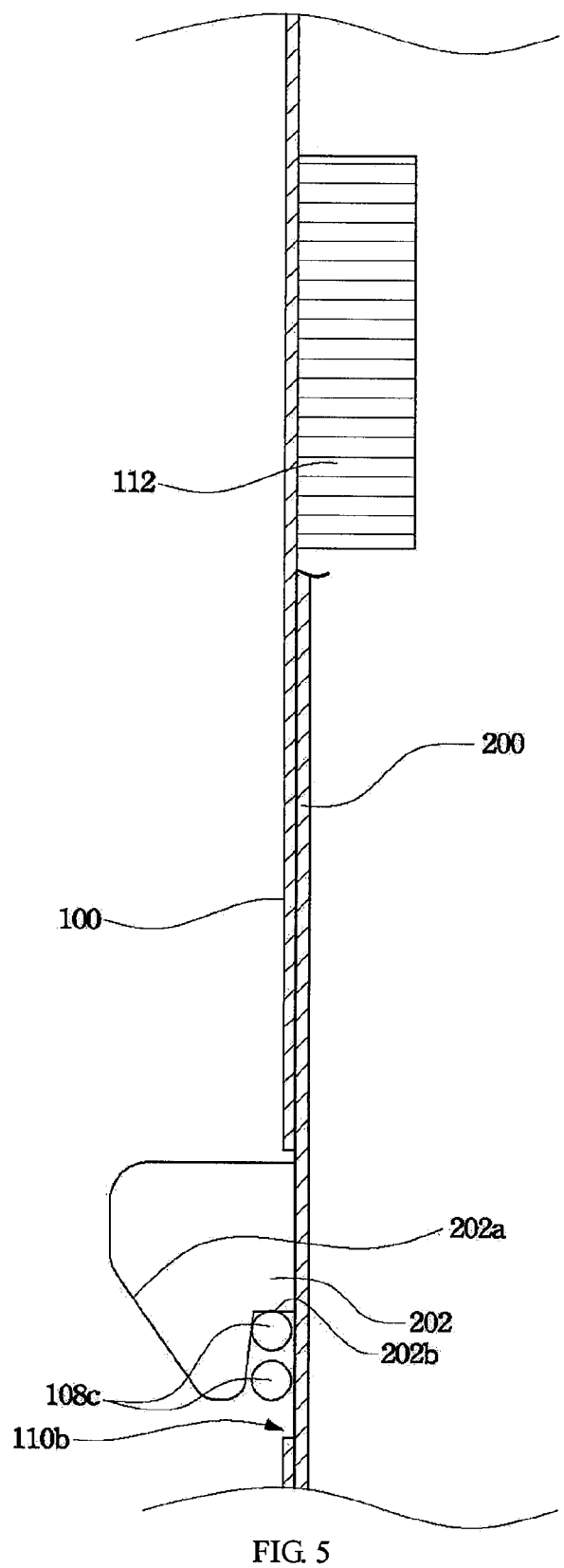

Please refer to FIG. 4 and FIG. 5 together, two figures show the sectional view along line A-A' of the connecting assembly in FIG. 3.

When the plate 100 and a second plate 200 are assembled, a hook 202 of the second plate 200 passes through the opening 110b of the plate 100 along direction 130, and an inclined surface 202a pushes the bending portion 108c along direction 140 (also the sliding direction of the metal wire 108) (as shown in FIG. 4). Basically, the direction 130 is perpendicular to the direction 140. When the hook 202 passes through the opening 110b completely, the bending portion 108c is inserted into a recess 202b of the hook 202 (as shown in FIG. 5) to prevent the hook 202 unlock the opening 110b, therefore, plate 100 and the second plate 200 is connected.

Figure 6:
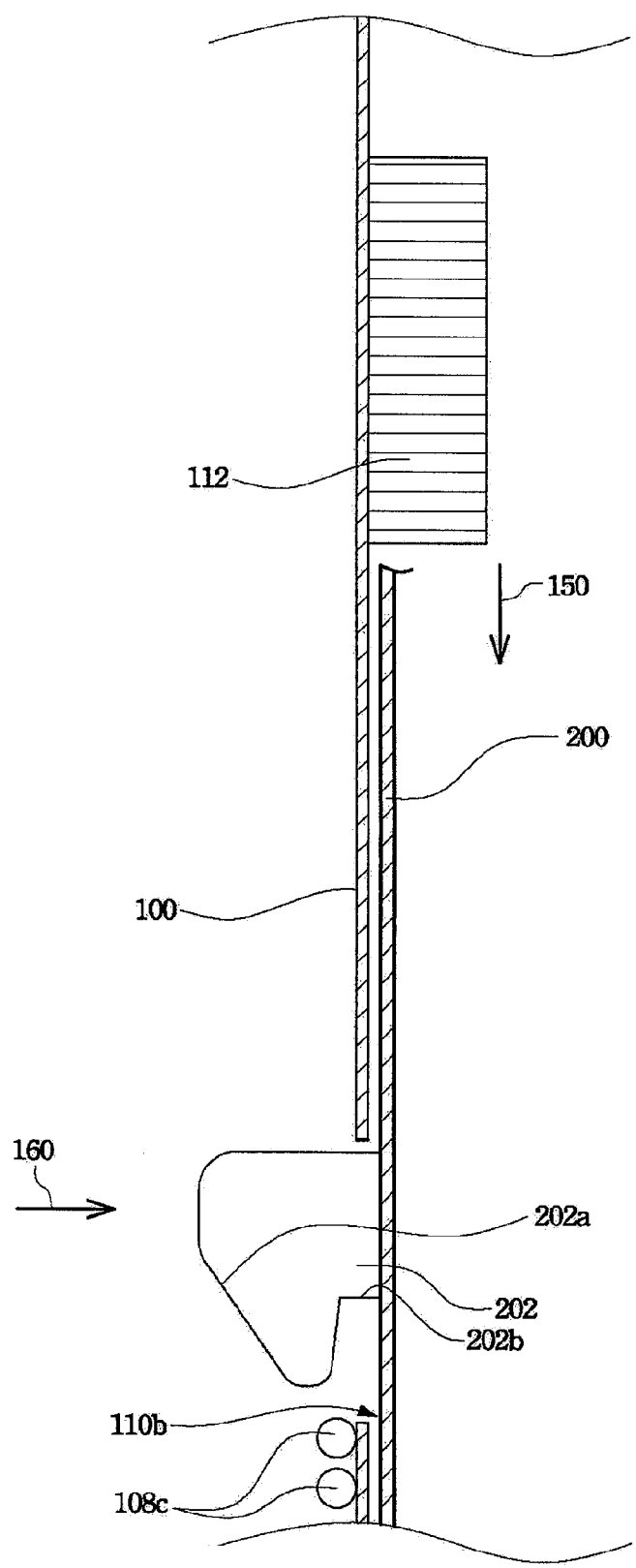
FIG. 6 shows the lateral view of the connecting assembly while disassembling two plates according to a preferred embodiment.

Please refer to FIG. 6. When the plate 100 is disassembled from the second plate 200, the user pushes the pressing element 112 along a direction 150 to against the tension force of the spring 106 (as shown in FIG. 2) and the metal wire 108 is driven to slide (as shown in FIG. 3), hence, the bending portion 108c is moved out of the hook 202 of the second plate 200. Therefore, the hook 202 of the second plate 200 is pulled out of the opening 110b on the plate 100 along a direction 160.

To sum up, with the assembly for connecting plates according to the preferred embodiments of the invention, the plates can be assembled or disassembled without screws by the metal wire and the spring. Therefore, the user can rapidly assemble or disassemble the two plates without any tool.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An assembly for connecting plates, the assembly comprising:
    a first plate having a first opening and a second opening;
    a metal wire movably connected to one surface of the first plate, the metal wire having a first end, a second end, and being bended to form a substantially U-shaped bending portion in a position corresponding to the position of the first opening;
    a spring connecting the first plate and the metal wire; and
    a pressing element fixed on the metal wire, the pressing element passing through the second opening of the first plate to protrude from the other surface of the first plate;
    when the first plate and a second plate with a hook are assembled, the hook of the second plate passes through the first opening of the first plate, and the hook engages the bending portion of the metal wire to connect the first and second plates;
    when the pressing element is pushed, the spring is then forced, and the metal wire is driven to move, the bending portion of the metal wire separates from the hook and the first plate and the second plate disassembled.

2. The assembly for connecting plates according to claim 1, wherein the hook of the second plate has an inclined surface.

3. The assembly for connecting plates according to claim 1, wherein the hook of the second plate has a recess, when the first plate and the second plate are assembled, the bending portion of the metal wire is inserted into the recess of the hook by the tension force of the spring.

4. The assembly for connecting plates according to claim 1, when the first plate and the second plate are assembled, the direction of the hook passing through the first opening is perpendicular to the direction of the metal wire sliding on the first plate.

5. The assembly for connecting plates according to claim 1, wherein the first opening is I-shaped.

6. The assembly for connecting plates according to claim 1, wherein the second opening is I-shaped.

7. The assembly for connecting plates according to claim 1, wherein the metal wire is disposed at an edge of the first plate.

8. The assembly for connecting plates according to claim 1, wherein the first plate and the second plate are housing plates of a computer host.

9. The assembly for connecting plates according to claim 1, wherein the metal wire is an iron wire.

* * * * *